May 14, 1929.  R. A. CASTLEMAN, JR  1,713,025
LOGARITHMIC AND SEMILOGARITHMIC COORDINATOR
Filed May 5, 1923

Inventor
R. A. Castleman Jr.
By Emery, Booth, Janney & Varney
his Attorneys

Patented May 14, 1929.

1,713,025

UNITED STATES PATENT OFFICE.

ROBERT A. CASTLEMAN, JR., OF FALLS CHURCH, VIRGINIA.

LOGARITHMIC AND SEMILOGARITHMIC COORDINATOR.

Application filed May 5, 1923. Serial No. 636,914.

This invention has reference to mechanism for plotting curves on logarithmic and semi-logarithmic bases. However, it is adapted for other, and perhaps equally important, uses, some of which will appear hereinafter.

It is well known that data obtained in certain laboratory investigations, for example, are interrelated according to the equations—

(1) $y = ax^n$
(2) $y = b \cdot 10^{mx}$
(3) $y = ce^{lx}$

Taking the logarithms of these equations, they become, (4) $\log y = \log a + n \log x$
(5) $\log_{10} y = \log_{10} b + mx$
(6) $\log_e y = \log_e c + lx$ Now, if the $x$ and $y$ of Equation (1) are plotted against each other on logarithmic bases (Equation 4), the curve representing said equation is a straight line, whose slope, with reference to the log $x$ axis, is "$n$".

If $x$ and $y$ of Equation (2) are plotted against each other on semi-logarithmic bases (Equation 5), the curve representing said equation is a straight line of slope "$m$" with respect to the $x$ axis.

Equation (3), involving Naperian logarithms, may be plotted semi-logarithmically in a manner similar to that outlined above in connection with Equation (2) except that the bases are interrelated according to the Naperian system (Equation 6).

Two well known plotting methods of investigating data expressed by the Equations (4) (5) (6) according to the foregoing theory are as follows: First, plotting the logarithms of the values of $x$ and $y$ on uniform cross section paper, and second, plotting the values of $x$ and $y$ on logarithmic plotting paper. The former method has two principal disadvantages, viz: First, it involves the use of a table of logarithms which is a tedious and difficult process; second, the value of "$a$" of Equation (1) can only be found by determining the antilogarithm of the $y$ intercept. The latter method also has two distinct disadvantages, viz: First, the determination of the slope of the plotted curve corresponding to Equation (4) involves the employment of a uniform scale in addition to the logarithmic scales; and second, interpolation in two directions simultaneously, is necessary, and this is especially difficult in this case. Semi-logarithmic plotting (Equations (5) and (6)) may be accomplished in an analogous manner but is subject to similar disadvantages.

My invention is designed to facilitate the investigation of such data as are interrelated according to Equations (1), (2) and (3), without the difficulties incident to the application of methods such as are outlined above. By the use of a suitable combination of logarithmic and uniform scales, as contemplated in my invention, I am enabled to dispense with continuous reference to tables of logarithms and also with the use of any form of specially prepared paper.

Referring now to the drawings, wherein I have shown one embodiment of my invention for illustrative purposes:

Figure 1:
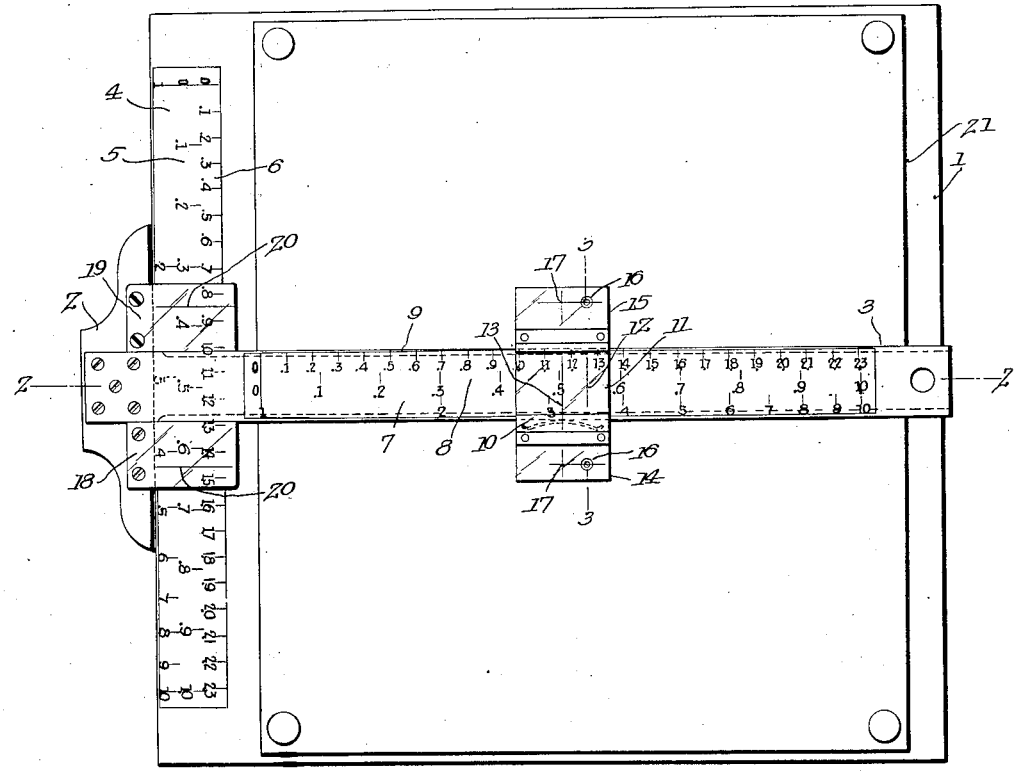
Figure 1 is a top plan view of my plotting device.
Figure 2:
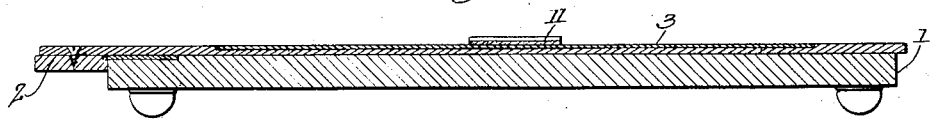
Fig. 2 is a sectional view taken on the line 2—2 of Fig. 1.
Figure 3:
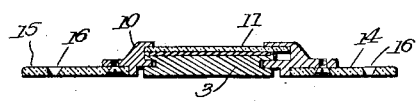
Fig. 3 is a sectional view taken on the line 3—3 of Fig. 1.

In the preferred embodiment of my invention, I employ a plotting board or surface 1 of suitable material and dimensions, such as an ordinary drawing board, for example, having opposite straight edges. One straight edge of the board forms a bearing surface for the head 2 to which is secured a slidable graduated rail member preferably in the form of a blade 3, the head and the blade, in the form illustrated, being similar to an ordinary T square, the head constituting guiding means for the rail member. The board 1 preferably has adjacent to one edge, a plurality of coextensive scales such as the scales 4, 5 and 6, the scale 4 being logarithmic and the scales 5 and 6 being uniform.

In the form of the device illustrated, the rail member or blade 3 is provided with coextensive scales 7, 8 and 9, suitably secured thereto, which are identical, respectively, with, and at right angles to, the scales 4, 5 and 6 also secured adjacent the edge of the board 1.

The logarithmic scales 4 and 7 are similar to those on the well known slide rule, that is, distances thereon, as measured from the origin, are proportional to the logarithms, on any base, of the numbers designating the divisional points, the unit of measurement employed being arbitrary. The uniform scales 5 and 8 are coextensive with and adjacent the respective logarithmic scales and are divided into ten equal parts, the divisional points being numbered successively from 0 to 1 by tenths. Hence the number designating any given division on these uniform scales is the Briggsian logarithm of the number (either a whole number or a whole number and decimal) representing an equal distance as measured from the origin on the logarithmic scales. For example as seen in Fig. 1, the numbers .3 and .6 on the uniform scales are almost adjacent the numbers 2 and 4 respectively on the logarithmic scales, the former numbers being approximately the Briggsian logarithms of the latter. The uniform scales 6 and 9 are constructed in a similar manner to the scales 5 and 8 except they are divided into slightly more than 23 equal parts (the divisional points being numbered successively from 0 to 2.3 by tenths). Hence the numbers designating any given division thereon are the Naperian logarithms of the numbers representing equal distances on the logarithmic scales.

The logarithmic scale 7 is adapted for use in conjunction with the corresponding scale 4 for logarithmic plotting (i. e., for plotting data governed by such equations as (1)), or with the scale 5 for semi-logarithmic plotting on the Briggsian base (i. e., for plotting data governed by such equations as (2)). Likewise, scale 7 may be used in conjunction with scale 6 for semi-logarithmic plotting on the Naperian base (i. e., for plotting data governed by such equations as (3)). It is obvious that the scales 4 and 8, as well as 4 and 9 are adapted for use, in conjunction, for semi-logarithmic plotting of data governed by such equations as (2) and (3) respectively.

To facilitate plotting points and investigating curves accurately, and to make it possible to use any desired combination of scales, I have provided a slider member 10 on the blade 3 or rail member. This slider preferably has a transparent portion 11 and a pair of scale indices 12 and 13 extending across the scales on the blade. The slider has projections 14 and 15 secured thereto on opposite sides of the blade. These projections are made, preferably, of transparent material, and have holes 16 in line with the scale index 12, adapted to accommodate a suitable marking implement such as a pencil. Also, adjacent to the holes 16, there are index points 17, preferably formed by crosses marked on the projections 14 and 15, in line with the scale index 13, the holes 16 and index points 17 being arranged on lines parallel with the edges of the blade 3.

To provide scale indices for the scales 4, 5 and 6 on the board, corresponding to the indices 12 and 13 on the slider, the head 2 on the rail member has projections 18 and 19, also preferably made of transparent material, rigidly attached to it on opposite sides of the blade 3. These projections 18 and 19 have index lines 20 on opposite sides of the blade which are the same distance apart as the corresponding holes 16 and the index points 17. As the rail member is moved across the board, the index lines 20 play over the scales 4, 5 and 6.

In a practical application of my invention for plotting data logarithmically, as indicated above, a blank sheet of ordinary paper 21 may be secured to the board 1 in such a position that the range of the given data as measured on the scales employed, shall be within the marginal limits of the paper. By setting one of the indices 20 on the logarithmic scale 4 at a point corresponding to a given value of $x$ and then setting the index line 12 on the slide at the corresponding value of $y$ on the scale 7, and marking through the hole 16 on the same side of the blade as the index 20, the point may be located upon the paper. Obviously either the righthand projections 14 and 18 or the lefthand projections 15 and 19 may be used in conjunction, depending upon the location of the particular point under inspection. By repeating the foregoing operation for various pairs of values of $x$ and $y$ all of the data may be plotted logarithmically.

This construction serves at least two purposes: (a) it is usually possible to avoid obstruction, such as thumb-tacks, and (b) it gives a longer effective bearing to the shoe 2 on the straight edge of the board 1. In a form of the device which I have found useful, it is always possible to use at least two-thirds of the length of the shoe 2. Both (a) and (b) are very important when accurate coordination with a reasonably small instrument is desired.

Semi-logarithmic plotting may be accomplished in a similar manner except that the logarithmic scale 7 and the uniform scale 5 are used in conjunction, if the equation is of form (2) or the logarithmic scale 7 and uniform scale 6 are used in conjunction for plotting equations of the form (3). It is obvious that the uniform scale 8 and the logarithmic scale 4, or the uniform scale 9 and the logarithmic scale 4, may likewise be used in conjunction for this form of plotting. It is obvious that my invention is also adapted for use, without further change, to uniform coordination. To this end, the pairs of scales 5 and 8, or 6 and 9, may conveniently be used in conjunction.

The uniform scales should be related to the logarithmic scales according to the Briggsian and Naperian systems of logarithms as previously described, in order to determine, directly, the constants of Equations (2) and (3). For example, the slope of the curve (a straight line), represented by these equations, may readily be determined by simply finding the tangent of the angle between the line and the $x$ axis by direct measurement and no further computation is involved.

After a set of the given data, as represented by any of the Equations (1) (2) and (3) (all of which, when plotted on proper bases, represent straight lines), has been plotted as hereinbefore outlined, the values of the constants therein may readily be determined by further manipulation of my device. For example, when it is desired to determine the value of "$n$" of Equation (1), which corresponds to the slope of the line, I prefer to utilize one of the index points 17 on the slider. The index mark 17 is set successively at two convenient points, preferably widely separated, on the given line and both the abscissa and ordinate distances are read from the scales 5 and 8, or 6 and 9 with the assistance, respectively, of one of the index lines 20 on the head 4 of the blade and the index 13 on the slider. It will be observed that, if this abscissa interval be made equal to 10 units, the ordinate distance, with its decimal point moved one digit to the left, will represent the slope of the line and hence the latter may be read directly on the scale 8 or 9.

To determine the value of the constant "$a$" in Equation (1), it is only necessary to set one of the index lines 20 at "1" on the scale 4 and the corresponding index mark 17 on the given line. The reading on the scale 7, under the index 13 is the value of the constant "$a$". The values of the constants in Equations (2) and (3) may be found in a manner quite similar to that outlined above, in connection with Equation (1), using the proper scales.

It is now apparent that, if the constants ($a$) and ($n$) of Equation (1) are known, as is often the case in design work, for example, my apparatus may be employed for determining corresponding values of ($x$) and ($y$). If one of the index lines 20 is set at 1 on scale 4 and the index 12 is set at the value of ($a$) on the scale 7 and a mark made through the hole 16 on the same side of the blade as the line 20, this point is the $y$ intercept point of the equation. A line having a slope corresponding to the given value of ($n$) may then easily be erected through this point with the assistance of one of the indices 20 and the index 12 and the uniform scales 5 and 8, or 6 and 9, respectively, in a manner converse to that outlined above, for finding the slope of a given line. After the line is thus erected any value of one of the variables, corresponding to a given value of the other, may be determined by the use of the index mark 17 on the slider, the index lines 13 and 20 and the logarithmic scales 7 and 4 respectively. For example, if it is desired to determine the value of $y$, corresponding to a given value of $x$, the index line 20 is set at the value of $x$ on the scale 4 and the slider is moved until the corresponding index mark 17 is on the line. Then the reading on the scale 7 under the index 13 is the value sought.

Corresponding values of ($x$) and ($y$) of equations similar to Equations (2) and (3) may also be determined in a similar manner except that the appropriate one of the uniform scales is used in conjunction with the appropriate logarithmic scale.

Obviously other scales, having larger or smaller divisions, may be employed, for convenience, in plotting data having large or small ranges.

My invention is not restricted to the specific embodiment herein disclosed.

Having thus described one illustrative embodiment of my invention, what I claim and desire to secure by Letters Patent is:

1. A coordinator for plotting and determining the characteristics of curves, comprising, in combination, a member having a plotting surface and a plurality of parallel scales associated therewith, a straight-edged member movable over said surface also having a plurality of parallel scales associated therewith, one of the scales on each member being logarithmic, and means to guide said straight-edged member over the plotting surface, so that it will lie in a series of parallel positions across and always at an angle to the scales associated with the plotting surface member.

2. A coordinator comprising, in combination, a board having a logarithmic scale adjacent to one edge of the board, a rail member movable on the board and also having a logarithmic scale, said rail member intersecting the logarithmic scale on the board, and means associated with the rail member and the board to guide the rail member over the board, so that it will assume parallel angular positions with respect to the scale on the board.

3. A coordinator comprising, in combination, a board having a plurality of coextensive scales, a straight edged member movable over the surface of the board and also having a plurality of coextensive scales, means for guiding the straight edged member in its movement over the board so that said scales on the straight edged member are always at right angles to the scales on the board, one of the scales on the board and one of the scales on the straight edged member being logarithmic and the other scales on said board and member being uniform and having divisions designated by numbers, each of which is the logarithm of the number which, on the logarithm scale, represents the same linear distance from the origin as that of the division to which it pertains.

4. A coordinator for plotting and determining the characteristics of curves, comprising, in combination, a member having a plotting surface and a logarithmic scale, a rail member movable over the surface and also having a logarithmic scale, guiding means for maintaining said rail member substantially at right angles to the first-mentioned logarithmic scale in all positions on the surface, and an index member slidably mounted on said rail member.

5. A coordinator comprising, in combination, a board having a straight edge and a scale parallel to the straight edge, a straight-edged member slidably mounted on the board and perpendicular to the straight edge of the board, said straight-edged member having a scale at right angles to the first mentioned scale, one of said scales being logarithmic and the other being uniform, and means to guide the straight edged member to move along the surface with its scales always at right angles to the straight edge of the board.

6. A coordinator comprising, in combination, a board having a scale parallel to one edge, and a member slidably mounted on the board and having a scale at right angles to the first mentioned scale, means to guide said member to move along the board with its scales always at right angles to the scale on the board, one of the scales being logarithmic and the other being uniform, said uniform scale having divisions designated by numbers, each of which is the logarithm of the number, which, on the logarithmic scale, represents the same linear distance from the origin as that of the division to which it pertains.

7. A coordinator comprising, in combination, a board having a plurality of scales parallel to one edge, a rail member presenting opposite straight edges and being slidable on the board, said rail member having a plurality of scales at right angles to the first mentioned scales, means to guide said rail member across the board with the scales thereon at right angles to the first mentioned scales, at least one of said scales being logarithmic, a slider on said rail member having projections on opposite sides thereof, each projection being provided with an aperture adapted to accommodate a marking implement, said slider having an index registering with the center of each aperture therein and cooperating with the scales on the rail member and the rail member having indices associated therewith cooperating with the scales on the board and spaced apart the same distance as are the said apertures.

8. A coordinator comprising, in combination, a board having a plurality of coextensive parallel scales, a substantially T-shaped member slidable on the board and having a plurality of co-extensive scales at right angles to the first mentioned scales, at least one of said scales being logarithmic, means to guide said T-shaped member always at right angles to said scales on the board, a slider on said T-shaped member having projections on opposite sides thereof each provided with an index mark, the slider having an index for said index marks cooperating with the scales on the T-shaped member, and the opposite sides of the T-shaped member having cooperating with the scales on the board, said latter indices being separated by a distance equal to that separating said index marks, and being parallel to the scales on the T-shaped member.

9. A coordinator comprising, in combination, a board having at least three coextensive scales parallel to one straight edge thereof, a substantially T-shaped member slidable upon said board and having at least three scales identical, respectively, with the scales on the board and at right angles thereto, said T-shaped member being guided to move at right angles to the straight edge of the board, one of the scales on said board and T-shaped member being logarithmic and both of the other scales thereon being uniform, said uniform scales being related to the logarithmic scales according to the Briggsian and the Naperian systems respectively.

10. A coordinator comprising, a board and a T-square, each having uniform and logarithmic scales, the scales on the T-square being arranged at right angles to those on the board and the T-square being guided to move over the board with the scales in such relation, whereby to enable the direct plotting of the equations $$y = ax^n$$
$$y = b \cdot 10^{mx} \text{ and}$$
$$y = ce^{lx}$$

said T-square having index means movable thereon for determining directly the constants of said equations when plotted, said index means being movable to such positions as to determine corresponding values of the unknown quantities of said equations when the constants are known.

In testimony whereof, I have signed my name to this specification.

ROBERT A. CASTLEMAN, Jr.

CERTIFICATE OF CORRECTION.

Patent No. 1,713,025.  Granted May 14, 1929, to

ROBERT A. CASTLEMAN, JR.

It is hereby certified that error appears in the printed specification of the above numbered patent requiring correction as follows: Page 4, line 75, claim 8, after the word "having" insert the word "indices"; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.